United States Patent
Frese (10) Patent No.: US 11,354,293 B2
(45) Date of Patent: Jun. 7, 2022

(54) METHOD AND APPARATUS FOR INDEXING MULTI-DIMENSIONAL RECORDS BASED UPON SIMILARITY OF THE RECORDS

(71) Applicant: HERE Global B.V., Eindhoven (NL)

(72) Inventor: Jörg Frese, Seattle, WA (US)

(73) Assignee: HERE GLOBAL B.V., Eindhoven (NL)

(*) Notice: Subject to any disclaimer, the term of this patent is extended or adjusted under 35 U.S.C. 154(b) by 184 days.

(21) Appl. No.: 16/774,107

(22) Filed: Jan. 28, 2020

(65) Prior Publication Data
US 2021/0232559 A1    Jul. 29, 2021

(51) Int. Cl.
G06F 16/22    (2019.01)
G06F 16/28    (2019.01)
G06N 20/00    (2019.01)

(52) U.S. Cl.
CPC ........ G06F 16/2264 (2019.01); G06F 16/285 (2019.01); G06N 20/00 (2019.01)

(58) Field of Classification Search
CPC .... G06F 16/2264; G06F 16/285; G06N 20/00
USPC .......................................... 707/741
See application file for complete search history.

(56) References Cited

U.S. PATENT DOCUMENTS

| | | | |
|---|---|---|---|
| 8,515,964 B2 | 8/2013 | Ravikumar et al. | |
| 10,467,201 B1* | 11/2019 | Merritt | G06F 16/215 |
| 10,599,614 B1* | 3/2020 | Borthwick | G06N 20/00 |
| 2014/0086492 A1 | 3/2014 | Iwamura et al. | |
| 2015/0169774 A1* | 6/2015 | Budzienski | G06F 16/24578 707/734 |
| 2016/0259880 A1* | 9/2016 | Semenyuk | G16B 15/00 |
| 2016/0307113 A1 | 10/2016 | Calapodescu et al. | |
| 2017/0147575 A1 | 5/2017 | Pappu et al. | |
| 2018/0068023 A1 | 3/2018 | Douze et al. | |

(Continued)

FOREIGN PATENT DOCUMENTS

| | | |
|---|---|---|
| CN | 109101567 A | 12/2018 |
| CN | 109948044 A | 6/2019 |
| WO | WO 2019/118253 A1 | 6/2019 |

OTHER PUBLICATIONS

Baxter, R. et al., *A Comparison of Fast Blocking Methods for Record Linkage*, Proceedings of the Workshop on Data Cleaning, Record Linkage and Object Consolidation at the Ninth ACM SIGKDD International Conference on Knowledge Discovery and Data Mining (Aug. 2003) 6 pages.

(Continued)

*Primary Examiner* — Evan Aspinwall
(74) *Attorney, Agent, or Firm* — Alston & Bird LLP (57) ABSTRACT

A method, apparatus and computer program product are provided to index a plurality of records based upon the similarity of the records along a plurality of dimensions. In the context of a method, one or more blocking keys are constructed for each of the plurality of records. A respective blocking key represents a string representation that combines components derived from attributes of a respective record, such as by concatenating components derived from attributes of the respective record. For a respective blocking key, the method determines a locality sensitive hash based upon the string representation of the respective blocking key. The method also includes indexing the respective record based upon the locality sensitive hash.

20 Claims, 3 Drawing Sheets

(56) References Cited

U.S. PATENT DOCUMENTS

2019/0272344 A1 9/2019 Lu et al.
2020/0409922 A1* 12/2020 Gschwind ........... G06F 16/2255

OTHER PUBLICATIONS

Liu, H. et al., *OPRCP: Approximate Nearest Neighbor Binary Search Algorithm for Hybrid Data Over WMSN Blockchain*, EURASIP Journal on Wireless Communications and Networking [online] [retrieved Aug. 23, 2019], Retrieved via the Internet: https://rd.springer.com/article/10.1186/s13638-018-1221-3 (dated Dec. 2018) 31 pages.

Yeddula, S. et al., *Investigation of Techniques for Efficient & Accurate Indexing for Scalable Record Linkage & Deduplication*, International Journal of Computer & Communication Technology, vol. 5, Issue 1 (2016) 24-30.

Extended European Search Report for European Application No. 21153853.3 dated Jun. 14, 2021, 9 pages.

Kim et al., "HARRA: Fast Iterative Hashed Record Linkage for Large-Scale Data Collections", Proceedings of the 13th International Conference on Extending Database Technology, (Mar. 22, 2010), pp. 525-536.

Isele et al., "Efficient Multidimensional Blocking for Link Discovery Without Losing Recall", 14th International Workshop on the Web and Databases, (Jun. 12, 2011), 6 pages.

\* cited by examiner

METHOD AND APPARATUS FOR INDEXING MULTI-DIMENSIONAL RECORDS BASED UPON SIMILARITY OF THE RECORDS

TECHNOLOGICAL FIELD

An example embodiment relates generally to a method, apparatus and computer program product for indexing a plurality of records based upon the similarity of the records and, more particularly, to indexing a plurality of multi-dimensional records.

BACKGROUND

A variety of applications require that records be identified from among a plurality of records, such as a database of records, that match or are otherwise similar. In instances in which the number of records is limited, a full pair wise similarity comparison may be made of the records in order to identify those records that match or are otherwise similar. However, as the number of records that are to be reviewed increases, a full pair wise similarity comparison becomes increasingly computationally expensive and, in some instances, potentially even prohibitive or infeasible.

Other typical techniques for identifying records that match or are otherwise similar are designed to identify this single best matching record or a small set of the records that are the best matches. While these techniques may provide relatively accurate results, the results may sometimes not be as complete as would be desired, such as by failing to identify additional records that are similar, but slightly less similar than the records that were identified to be the single best matching record or to be included in the small set of the records. While accuracy of the results is a consideration, the completeness of the results is also a consideration since at least some application prefer a larger set of results from a matching analysis, even if the accuracy of at least some of the results is somewhat less.

In an effort to reduce the computational complexity associated with these matching techniques, records may be indexed according to a key. Once indexed, records can be compared for purposes of identifying records that match or are otherwise sufficiently similar in a manner that consumes fewer computational resources and is more efficient. However, the indexing of the records results in the loss of at least some information, thereby potentially reducing the accuracy of the results that are generated.

In some applications, the records that are reviewed have multiple dimensions with the similarity of the records being considered across the plurality of dimensions. Even with multi-dimensional records, some techniques for identifying records that match or are otherwise substantially similar identify records that match or are substantially similar based upon an analysis along a single dimension. As the records that are identified to match or otherwise be substantially similar in the single dimension may not necessarily match or be substantially similar along one or more of the other dimensions, the results of such a single dimensional matching analysis may be less accurate than is desired and, in some instances, may require further analysis of the records to determine their similarity along one or more of the other dimensions, thereby decreasing the efficiency with which multi-dimensional records that match or are otherwise substantially similar are identified.

BRIEF SUMMARY

A method, apparatus and computer program product are provided in order to index a plurality of records based upon the similarity of the records along a plurality of dimensions. The method, apparatus and computer program product of an example embodiment are configured to index the records in a manner that takes into account the plurality of dimensions, thereby permitting records that match or are otherwise similar to be efficiently identified. Additionally, the method, apparatus and computer program product of an example embodiment are configured to index the multi-dimensional records in such a manner that the similarity of the records is determined over the plurality of dimensions such that the results of the analysis is complete subject to reasonable accuracy by identifying records that are similar along at least one dimension without identifying an undesirable number of dissimilar records.

In an example embodiment, a method is provided for indexing a plurality of records based upon the similarity of the records along a plurality of dimensions. The method includes constructing one or more blocking keys for each of the plurality of records. A respective blocking key represents a string representation that combines components derived from attributes of a respective record, such as by concatenating components derived from attributes of the respective record. For the respective blocking key, the method determines a locality sensitive hash based upon the string representation of the respective blocking key. The method also includes indexing the respective record based upon the locality sensitive hash.

The method of an example embodiment also includes transforming, for the respective blocking key of a respective record, the string representation of the respective blocking key to a numeric vector. In this example embodiment, the method determines the locality sensitive hash based upon the numeric vector. The method of an example embodiment also includes providing, based on the indexing, batches of the plurality of records that, within a respective batch, are similar along at least one dimension to facilitate labeling of the plurality of records in advance of training a machine-learned classification model utilizing the plurality of records, as labeled.

The method of an example embodiment indexes the respective record by associating the respective record with each of a plurality of sub-indices based upon the locality sensitive hash. In this example embodiment, the number of sub-indices corresponds to the number of blocking keys for the respective record. In this regard, the number of sub-indices may equal the number of blocking keys for the respective record. In an example embodiment, each blocking key of the one or more blocking keys represents a different string representation that combines components derived from attributes of the respective record. In an example embodiment, each blocking key of the one or more blocking keys represents a string representation that combines components that are differently derived from attributes of the respective record or components derived from different attributes of the respective record. The respective blocking key of an example embodiment is based upon attributes representative of the plurality of dimensions of the respective record.

In another example embodiment, an apparatus is provided that is configured to index a plurality of records based upon a similarity of the records along a plurality of dimensions. The apparatus includes processing circuitry and at least one memory including computer program code instructions. The computer program code instructions are configured to, when executed by the processing circuitry, cause the apparatus to construct one or more blocking keys for each of the plurality of records. A respective blocking key represents a string representation that combines components derived from attributes of a respective record, such as by concatenating components derived from attributes of the respective record. The computer program code instructions are also configured to, when executed by the processing circuitry, cause the apparatus to determine, for the respective blocking key, a locality sensitive hash based upon the string representation of the respective blocking key. The computer program code instructions are further configured to, when executed by the processing circuitry, cause the apparatus to index the respective record based upon the locality sensitive hash.

The computer program code instructions are further configured to, when executed by the processing circuitry, cause the apparatus of an example embodiment to transform, for the respective blocking key of a respective record, the string representation of the respective blocking key to a numeric vector. In this example embodiment, the computer program code instructions are configured to, when executed by the processing circuitry, cause the apparatus to determine the locality sensitive hash based upon the numeric vector. In an example embodiment, the computer program code instructions are further configured to, when executed by the processing circuitry, cause the apparatus to provide, based on the indexing, batches of the plurality of records that, within a respective batch, are similar along at least one dimension to facilitate labeling of the plurality of records in advance of training a machine-learned classification model utilizing the plurality of records, as labeled.

The computer program code instructions are configured to, when executed by the processing circuitry, cause the apparatus of an example embodiment to index the respective record by associating the respective record with each of a plurality of sub-indices based upon the locality sensitive hash. In this example embodiment, the number of sub-indices corresponds to a number of blocking keys for the respective record. For example, the number of sub-indices may equal the number of blocking keys for the respective record. In an example embodiment, each blocking key of the one or more blocking keys represents a string representation that combines components that are differently derived from attributes of the respective record or components derived from different attributes of the respective record. The respective blocking key of an example embodiment is based upon attributes representative of the plurality of dimensions of the respective record.

In a further example embodiment, a computer program product is provided that is configured to index a plurality of records based upon a similarity of the records along a plurality of dimensions. The computer program product includes at least one non-transitory computer-readable storage medium having computer-executable program code instructions stored therein with the computer-executable program code instructions including program code instructions configured, upon execution, to construct one or more blocking keys for each of the plurality of records. A respective blocking key represents a string representation that combines components derived from attributes of a respective record, such as by concatenating components derived from attributes of the respective record. The computer-executable program code instructions also include program code instructions configured, upon execution, to determine, for the respective blocking key, a locality sensitive hash based upon the string representation of the respective blocking key. The computer-executable program code instructions further include program code instructions configured, upon execution, to index the respective record based upon the locality sensitive hash.

The computer-executable program code instructions of an example embodiment also include program code instructions configured, upon execution, to transform, for the respective blocking key of a respective record, the string representation of the respective blocking key to a numeric vector. In this example embodiment, the program code instructions configured to determine the locality sensitive hash include program code instructions configured to determine the locality sensitive hash based upon the numeric vector. In an example embodiment, the computer-executable program code instructions also include program code instructions configured, upon execution, to provide, based on the indexing, batches of the plurality of records that, within a respective batch, are similar along at least one dimension to facilitate labeling of the plurality of records in advance of training a machine-learned classification model utilizing the plurality of records, as labeled.

The program code instructions configured to index the respective record may include program code instruction configured to associate the respective record with each of a plurality of sub-indices based upon the locality sensitive hash. In this example embodiment, the number of sub-indices corresponds to the number of blocking keys for the respective record. For example, the number of sub-indices may equal the number of blocking keys for the respective record. In an example embodiment, each blocking key of the one or more blocking keys represents a different string representation that combines components derived from attributes of the respective record. In an example embodiment, each blocking key of the one or more blocking keys represents a string representation that combines components that are differently derived from attributes of the respective record or components derived from different attributes of the respective record. The respective blocking key of an example embodiment is based upon attributes representative of the plurality of the dimensions of the respective record.

In yet another example embodiment, an apparatus is provided for indexing a plurality of records based upon the similarity of the records along a plurality of dimensions. The apparatus includes means for constructing one or more blocking keys for each of the plurality of records. A respective blocking key represents a string representation that combines components derived from attributes of a respective record, such as by concatenating components derived from attributes of the respective record. The apparatus also includes means for determining, for the respective blocking key, a locality sensitive hash based upon the string representation of the respective blocking key. The apparatus further includes means for indexing the respective record based upon the locality sensitive hash.

The apparatus of an example embodiment also includes means for transforming, for the respective blocking key of a respective record, the string representation of the respective blocking key to a numeric vector. In this example embodiment, the means for determining the locality sensitive hash includes means for determining the locality sensitive hash based upon the numeric vector. The apparatus of an example embodiment also includes means for providing, based on the indexing, batches of the plurality of records that, within a respective batch, are similar along at least one dimension to facilitate labeling of the plurality of records in advance of training a machine-learned classification model utilizing the plurality of records, as labeled.

The means for indexing the respective record may include means for associating the respective record with each of a plurality of sub-indices based upon the locality sensitive hash. In this example embodiment, the number of sub-indices corresponds to a number of blocking keys for the respective record. For example, the number of sub-indices may equal the number of blocking keys for the respective record. In an example embodiment, each blocking key of the one or more blocking keys represents a different string representation that combines components derived from attributes of the respective record. In an example embodiment, each blocking key of the one or more blocking keys represents a string representation that combines components that are differently derived from attributes of the respective record or components derived from different attributes of the respective record. The respective blocking key of an example embodiment is based upon attributes representative of the plurality of dimensions of the respective record.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to index a plurality of records based upon the similarity of the records along a plurality of dimensions. The indexing of the records permits records that match or are otherwise similar to be identified, which may be useful in a wide variety of applications. Although any of the wide variety of records may be indexed in accordance with an example embodiment, the records may have a plurality of dimensions with the similarity of the records being determined along the plurality of dimensions, thereby enhancing the confidence with which the records are matched.

Figure 1:
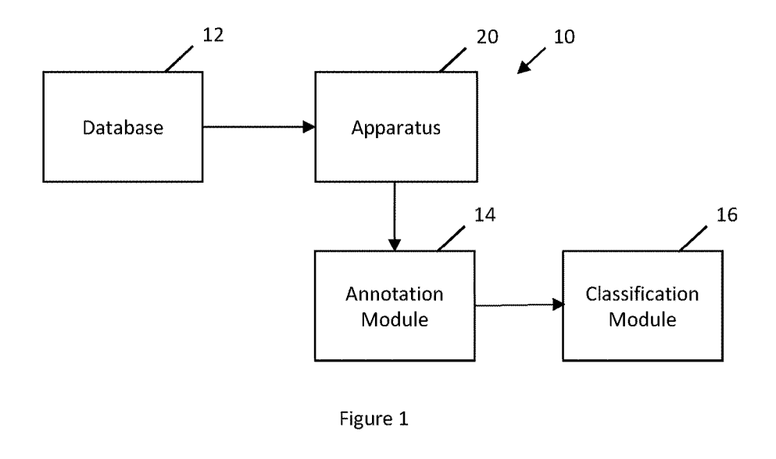
FIG. 1 is a block diagram of a system for training a machine-learned classification model utilizing records that have been indexed based upon the similarity of the records along a plurality of dimensions by an apparatus in accordance with an example embodiment of the present disclosure.

With reference to FIG. 1 as an example of an application that relies upon the identification of multi-dimensional records that match or are otherwise similar, a system 10 configured to provide for the efficient annotation of the batches of records that have been identified to be reasonably similar (or dissimilar), such as to a seed record, with the resulting annotated records then being utilized by a training algorithm in the development of a machine-learned model, such as a machine-learned classification model, e.g., a binary classification model, is depicted. In the illustrated embodiment, the system includes a database 12 storing a plurality of records, although the records may be provided in other manners in other embodiments. As described below, the system includes an apparatus 20 configured in accordance with an example embodiment of the present disclosure to index the plurality of records based upon a similarity of the records along a plurality of dimensions. As shown in FIG. 1, the system also includes annotation module 14 that provides for the annotation of the records that are identified to be similar, based upon the indexing of the records. Although the records may be annotated in various manners, the records of an example embodiment are annotated by one or more persons trained to annotate records that are utilized to train a classification model, such as by labeling one or more features of the records. As shown in FIG. 1, the system also includes a machine-learned classification model 16 that is trained based upon the records that are identified to match or otherwise be similar and, in the illustrated embodiment, that have also been annotated.

In order to facilitate the training of the machine-learned classification model 16, the indexing of the plurality of records based upon the similarity of the records is configured to be complete subject to reasonable accuracy. Moreover, the indexing of the plurality of records based upon the similarity of the records along the plurality of dimensions facilitates the identification of similar multi-dimensional records by taking into account the plurality of dimensions and assessing similarity upon the plurality of dimensions. As such, the efficiency with which batches of records that have been similarly indexed may be annotated in advance of the training of the classification model utilizing the annotated records may be enhanced.

As noted above, the records may be any of a plurality of different types of records. By way of example, but not of limitation, place of interest (POI) records will be discussed hereinbelow. POI records identify various places of interest, such as in conjunction with the display of a map by a mapping system, the provision of directions by a navigation system or other applications. POI records may represent a wide variety of places including specific buildings, restaurants, places of business, schools, museums, venues, etc. Regardless of the type of a place of interest, the POI records have a plurality of dimensions. Although the dimensions of the POI records may vary depending upon, for example, the type of POI record, examples of the dimensions of some POI records include the name of the place of interest, the address of the place of interest, the phone number of the place of interest, the geographic distance to the place of interest from a predefined location, such as a user's current location, etc. In an embodiment in which the records are POI records, the machine-learned classification model 16 may be trained to identify POI records that match or are otherwise similar to certain POI records, thereby facilitating, for example, the deduplication of a database by the machine-learned classification model which combs records found to be referring to the same real-world place.

Figure 2:
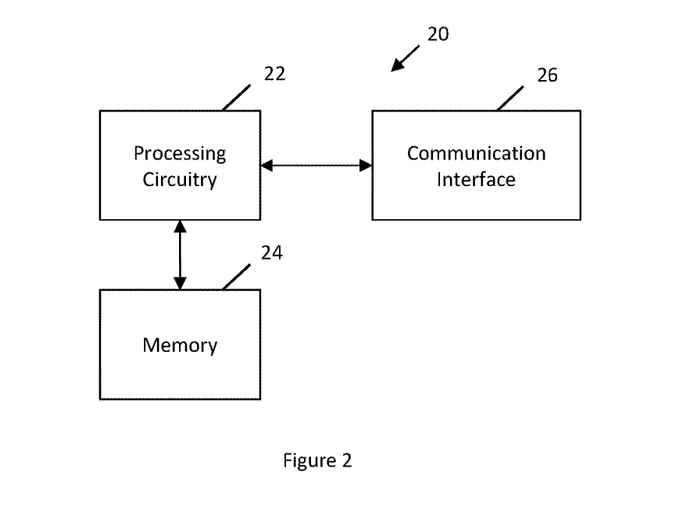
FIG. 2 is a block diagram of an apparatus that may be specifically configured in accordance with an example embodiment of the present disclosure in order to index a plurality of records based upon a similarity of the records along the plurality of dimensions.

Referring now to FIG. 2, an apparatus 20 that may be specifically configured to index a plurality of records based upon the similarity of the records along a plurality of dimensions is depicted. The apparatus may be embodied by any of a wide variety of computing devices including, for example, a server, a distributed network of computing devices, a navigation system, a mapping system, a computer workstation, a personal computer or any other type of computing device. Regardless of the type of computing device that embodies the apparatus, the apparatus of an example embodiment includes, is associated with or otherwise is in communication with processing circuitry 22, memory 24 and optionally a communication interface 26.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 22 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as a database 12 that stores records, e.g., POI records, an annotation module 14, a machine-learned classification model 16 or other machine-learned model, or the like. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Figure 3:
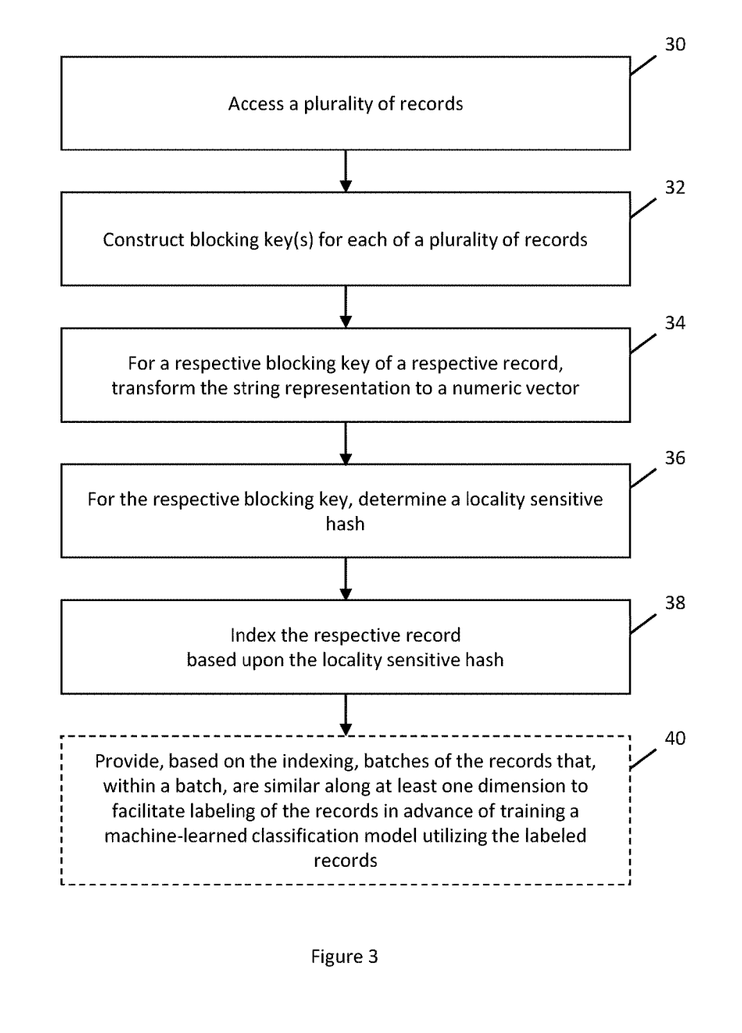
FIG. 3 is a flowchart illustrating the operations performed, such as by the apparatus of FIG. 2, in order to index a plurality of records based upon the similarity of the records along a plurality of dimensions in accordance with an example embodiment of the present disclosure.

Referring now to FIG. 3, the operations performed, such as by the apparatus 20 of FIG. 2, in order to index a plurality of records based upon the similarity of the records along a plurality of dimensions are depicted. As shown in block 30 of FIG. 3, the apparatus includes means, such as the processing circuitry 22, the memory 24, the communication interface 26 or the like, configured to access a plurality of records, such as a plurality of POI records. In an example embodiment, the plurality of records are stored by the memory so as to be accessible by the processing circuitry. Alternatively, the records may be stored by a database 12. In an example embodiment and as shown in FIG. 1, the database that stores the records may be external to the apparatus, but accessible to the apparatus, such as via the communication interface, such that the apparatus can access the records stored thereby. In yet another example embodiment, the plurality of records may be received by the apparatus, such as the processing circuitry via the communication interface, such as from another external source of the records.

In order to index the records, the apparatus 20 of an example embodiment includes means, such as the processing circuitry 22 or the like, configured to construct one or more blocking keys for each of the plurality of records. See block 32 of FIG. 3. A blocking key of an example embodiment represents a string representation that combines components derived from the attributes of a respective record. Although the components derived from the attributes of the respective record may be combined in various manners, the apparatus, such as the processing circuitry, of an example embodiment is configured to construct a respective blocking key so as to represent the string representative that concatenates components derived from attributes of the respective record. The attributes of a respective record are representative of the plurality of dimensions of the respective record. For example, each attribute may be representative of a respective dimension of the record. With respect to a POI record, for example, a first attribute may represent the address of the POI, a second attribute may represent the location of the POI in latitude and longitude, a third attribute may represent the telephone number of the POI, a fourth attribute may represent the name of the POI, etc. By combining components derived from the attributes of the respective record, the resulting blocking key represents facets of multiple dimensions of the record.

The components derived from the attributes of a respective record may be derived by the apparatus 20, such as the processing circuitry 22, in various manners. For example, the components derived from attributes of the respective record may include the attributes themselves, such as the address of a POI, the location of the POI in latitude and longitude, the telephone number of the POI, the name of the POI, etc. Alternatively, the components derived from the attributes of a respective record may represent an attribute, but in a modified form, such as by representing an attribute with only the first few characters, e.g., letters or numbers, of the attribute, representing an attribute phonetically, representing an attribute by a common misspelling of the attribute, etc. Still further, the components may be derived from the attributes of a respective record in different manners with some components including the corresponding attributes themselves and other components including modified forms of the same or different attributes. The attributes of the record from which the components are derived for purposes of defining a blocking key may include all of the attributes of the record or a subset, that is, some, but less than all, of the attributes of the record.

The components that are derived from attributes of a respective record are combined, such as by being concatenated, into a string representation that represents a blocking key for the respective record. Although a single blocking key may be constructed for each respective record, a plurality of blocking keys may be constructed for at least some of the records. In this example embodiment, the different blocking keys that are constructed for a respective record represent different string representations that combine components derived from the attributes of the respective record. In this regard, the different string representations may combine components that are differently derived from attributes of the respective record and/or components derived from different attributes of the respective record. For example, a first blocking key of a record may be constructed by a string representation that combines all of the attributes of the record without modification for each of the plurality of dimensions of the respective record, while a second blocking key is constructed by a string representation that combines components of a subset of the attributes and, therefore, a subset of the dimensions of the respective record. As a record having a plurality of dimensions may have the attributes corresponding to the dimensions combined in a plurality of different manners, these different combinations of the attributes representative of the different dimensions of a respective record may result in the construction of a plurality of blocking keys. Additionally or alternatively, different blocking keys may be constructed based upon the same attributes of the respective record (either all of the attributes of a record or a subset of the attributes of the record), but with the components being differently constructed from these same attributes for each of the different blocking keys. For example, some blocking keys may be constructed that include components that represent an attribute without modification, while other blocking keys include components that differently represent the same attribute, such as by representing an attribute with only the first few characters of the attribute, representing an attribute phonetically, representing an attribute with a common misspelling, etc.

In the illustrated embodiment, the apparatus 20 also includes means, such as the processing circuitry 22 or the like, configured to transform, for a respective blocking key of a respective record, the string representation of the respective blocking key to a numeric vector, thereby representing the blocking key as a numerical object. See block 34 of FIG. 3. In some embodiments, the numeric vectors into which a plurality of blocking keys are transformed have the same predefined length as a result of the manner in which the blocking keys are constructed. However, in an embodiment in which the numeric vectors representative of the plurality of blocking keys have different lengths, the apparatus, such as the processing circuitry, may be configured to further process the initial numeric vectors, such as by padding the initial numeric vectors, such that the resulting numeric vectors have the same length, such as a predefined length.

As shown in block 36 of FIG. 3, the apparatus 20 also includes means, such as the processing circuitry 22 or the like, configured to determine a locality sensitive hash for respective blocking keys. In this regard, the apparatus, such as the processing circuitry, is configured to determine a locality sensitive hash for each of the blocking keys. The apparatus, such as the processing circuitry, is configured to determine the locality sensitive hash based upon the string representation of the respective blocking key and, in the illustrated embodiment, based upon the numeric vector into which the string representation of the respective blocking key has been transformed. The locality sensitive hash creates a hash signature with the locality sensitive hash being configured such that records represented by the same or similar string representations, such as the same or similar numeric vectors, have a substantial likelihood of creating the same or very similar hash signatures having the same hash values. Thus, a locality sensitive hash effectively bins or groups the numeric vectors representative of the blocking keys such that numeric vectors representative of matching or similar records are binned or grouped together with the bins or groups designated by the respective hash signatures.

As shown in block 38 of FIG. 3, the apparatus 20 also includes means, such as the processing circuitry 22 or the like, configured to index the respective record for which a locality sensitive hash has been determined based upon the locality sensitive hash. In an example embodiment, the apparatus, such as the processing circuitry, is configured to separately index each of the records for which a locality sensitive hash has been determined. In this regard, the hash signature generated by the determination of the locality sensitive hash may serve as the key to the index of the respective record.

As noted above, a plurality of blocking keys may be constructed for a respective record. In this instance, the apparatus 20, such as the processing circuitry 22, is configured to index the respective record by associating the respective record with each of a plurality of sub-indices based upon the locality sensitive hash. In this regard, the apparatus, such as the processing circuitry, is configured to determine a separate locality sensitive hash and, as a result, a separate hash signature for each of the blocking keys that is constructed for the respective record. Based upon the plurality of resulting hash signatures, the respective record is associated with the plurality of sub-indices with each of the hash signatures serving as the key for the respective record into a corresponding sub-index. In this example embodiment, the number of sub-indices with which a respective record is associated corresponds to the number of blocking keys for the respective record. More particularly, the number of sub-indices with which a respective record is associated may equal the number of blocking keys constructed for the respective record.

Figure 4:
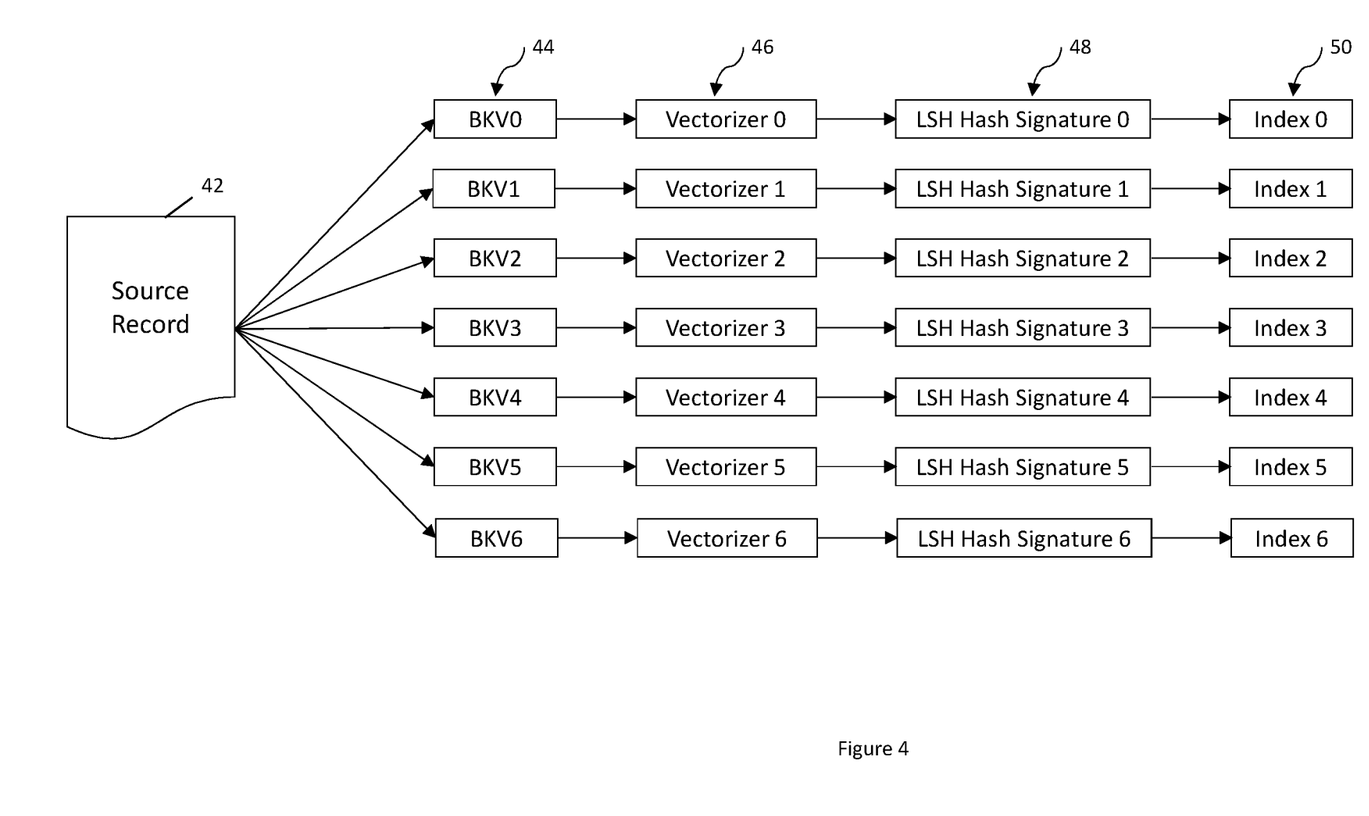
FIG. 4 is a graphical representation of the indexing of a plurality of records based upon the similarity of the records along the plurality of dimensions in accordance with an example embodiment of the present disclosure.

An example of the indexing of a plurality of records based upon the similarity of the records along a plurality of dimensions is depicted in FIG. 4. As shown, a source record 42 is accessed and a plurality of blocking keys 44 designated BKV0, . . . BKV6 are constructed, each of which represents a different string representation that combines components derived from attributes of the respective record, such as components that are differently derived from attributes of the respective record and/or components derived from different attributes of the respective record. The apparatus 20, such as the processing circuitry 22, of this example embodiment is configured to then transform each blocking key of the record into a corresponding numeric vector 46 designated Vectorizer 0, . . . Vectorizer 6. The apparatus, such as the processing circuitry, of this example embodiment is then configured to determine the locality sensitive hash 48 of each numeric vector in order to create a plurality of locality sensitive hash signatures designated LSH Hash Signature 0, . . . LSH Hash Signature 6. In this example embodiment, the apparatus, such as the processing circuitry, is configured to index the record in each of a plurality of parallel sub-indices 50 designated Index 0, . . . Index 6 based upon the respective locality sensitive hash signatures. In this regard, the respective record is indexed in Index 0 based upon a LSH Hash Signature 0, is indexed in Index 1 based upon LSH Hash Signature 1 and so on. Thus, the same record may be indexed into a plurality of sub-indices based upon the different blocking keys that are constructed for the same record.

The apparatus 20, such as the processing circuitry 22, of this example embodiment is configured to process a plurality of records with each respective record indexed into one or more sub-indices. Thus, the records that are indexed into the same sub-index represent a batch of records that match or are otherwise similar along a plurality of dimensions. Thus, the indexing of the records as described above facilitates the identification of records that match or are otherwise similar as a result of the common indexing of such records into the same sub-index. The identification of batches of records that match or are otherwise similar to a reference record along at least one dimension may be utilized for a variety of purposes and by a variety of applications. In an example embodiment described above in conjunction with FIG. 1 and in block 40 of FIG. 3, however, the batches of the records that match or are otherwise similar to a reference record along at least one dimension may be identified and may then be optionally provided, as evidenced by the dashed outline of block 40, as training and validation examples for the development of a machine-learned classification model 16 to improve the completeness with which the classification model identifies similar records in response to a query of the trained classification model. Thus, the apparatus, such as the processing circuitry, of an example embodiment is configured to identify one or more records to be utilized as training and validation examples in conjunction with the training of a machine-learned model, e.g., a machine-learned classification model, based upon the indices of the records, such as by training the machine-learned model utilizing records that match or are otherwise similar as a result of being indexed in the same manner.

In this regard, the apparatus 20, such as the processing circuitry 22, is configured to index a seed record that relates to a place of interest, such as a reference record that relates to a predefined POI, for which the classification model 16 is to be trained to recognize. The apparatus, such as the processing circuitry, of this example embodiment is also configured to process a plurality of other POI records to identify the similarity of the records along a plurality of dimensions. Those records that are indexed into the same one or more sub-indices into which the seed record is indexed are then identified as records that match or are otherwise similar along at least one dimension with respect to the seed record. For example, at least some of the other records may be indexed into the same sub-indices as the seed record as a result of these other records also including reference to the same POI as the seed record. In this example embodiment, the batches of the other records that are indexed into the same sub-indices as the seed record are identified to match or are otherwise be similar to the seed record along at least one dimension and are then provided to annotators to facilitate labeling of the plurality of records in advance of training a machine-learned classification model utilizing the labeled records. For example, the records that match or are otherwise similar to the seed record may be submitted to the annotation module 14, such as implemented by a trained human annotator who labels the records. Based upon the similarity to the seed record that relates to a place of interest, the different batches of records may be efficiently labeled as either also relating to the place of interest (for the records that share the same sub-index as the seed record) or being unrelated or less related to the place of interest (for the records that have different sub-indices than the seed record). The annotated records are then provided to a training algorithm in order to train the classification model to better identify records that relate to the same POI as the seed record. Following this training, the resulting machine-learned classification model can more accurately respond to subsequent queries regarding the POI by identifying records that reference the same POI. Thus, the method of an example embodiment not only indexes the records as described above and trains the machine-learned classification model utilizing the annotated records that have been indexed, but also responds to a query by identifying one or more records that are relevant to the query utilizing the machine-learned classification model, as now trained.

The method, apparatus 20 and computing program product of an example embodiment therefore facilitate the indexing of records based upon the similarity of the records along the plurality of dimension in a manner that is complete subject to reasonable accuracy, and does so in computationally efficient manner, thereby conserving computational resources and time. By imposing reasonable accuracy constraints on completeness, the method, apparatus and computer program product of an example embodiment are configured to identify a set of sufficiently near neighbors (to the POI of the seed record) while retaining variability across multiple dimensions of similarity, which is advantageous for various applications including the efficient construction of a dataset of training and validation examples for the development of a machine-learned model. Although described herein in conjunction with POI records and also in conjunction with the development of a machine-learned classification model 16, the method, apparatus and computer program product of an example embodiment may be utilized in conjunction with any of a wide variety of records and for any of the wide variety of applications that benefit from the indexing of records based upon the similarity of the records along the plurality of dimensions including, for example, by providing for de-duplication of records as is advantageous for a plurality of applications.

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for indexing a plurality of records based upon a similarity of the records along a plurality of dimensions, the method comprising:
   for each of the plurality of records, constructing one or more blocking keys, wherein a respective blocking key represents a string representation that combines components derived from attributes of a respective record;
   for the respective blocking key, determining a locality sensitive hash based upon the string representation of the respective blocking key;
   indexing the respective record based upon the locality sensitive hash; and
   training a machine-learned classification model utilizing a batch of records that have been identified, based on the indexing, to be similar along at least one dimension.

2. A method according to claim 1 further comprising transforming, for the respective blocking key of a respective record, the string representation of the respective blocking key to a numeric vector, wherein determining the locality sensitive hash comprises determining the locality sensitive hash based upon the numeric vector.

3. A method according to claim 1 further comprising providing, based on the indexing, batches of the plurality of records that, within a respective batch, are similar along at least one dimension to facilitate labeling of the plurality of records in advance of training the machine-learned classification model utilizing the plurality of records, as labeled.

4. A method according to claim 1 wherein indexing the respective record comprises associating the respective record with each of a plurality of sub-indices based upon the locality sensitive hash, and wherein a number of sub-indices corresponds to a number of blocking keys for the respective record.

5. A method according to claim 4 wherein the number of sub-indices equals the number of blocking keys for the respective record.

6. A method according to claim 1 wherein each blocking key of the one or more blocking keys represents a different string representation that combines components derived from attributes of the respective record.

7. A method according to claim 1 wherein each blocking key of the one or more blocking keys represents a string representation that combines components that are differently derived from attributes of the respective record or components derived from different attributes of the respective record.

8. A method according to claim 1 wherein the respective blocking key represents the string representation that concatenates components derived from attributes of the respective record.

9. A method according to claim 1 wherein the respective blocking key is based upon attributes representative of the plurality of dimensions of the respective record.

10. An apparatus configured to index a plurality of records based upon a similarity of the records along a plurality of dimensions, the apparatus comprising processing circuitry and at least one memory including computer program code instructions, the computer program code instructions configured to, when executed by the processing circuitry, cause the apparatus to:
- for each of the plurality of records, construct one or more blocking keys, wherein a respective blocking key represents a string representation that combines components derived from attributes of a respective record;
- for the respective blocking key, determine a locality sensitive hash based upon the string representation of the respective blocking key;
- index the respective record based upon the locality sensitive hash; and
- train a machine-learned classification model utilizing a batch of records that have been identified, based on the indexing, to be similar along at least one dimension.

11. An apparatus according to claim 10 wherein the computer program code instructions are further configured to, when executed by the processing circuitry, cause the apparatus to transform, for the respective blocking key of a respective record, the string representation of the respective blocking key to a numeric vector, and wherein the computer program code instructions are configured to, when executed by the processing circuitry, cause the apparatus to determine the locality sensitive hash by determining the locality sensitive hash based upon the numeric vector.

12. An apparatus according to claim 10 wherein the computer program code instructions are further configured to, when executed by the processing circuitry, cause the apparatus to provide, based on the indexing, batches of the plurality of records that, within a respective batch, are similar along at least one dimension to facilitate labeling of the plurality of records in advance of training the machine-learned classification model utilizing the plurality of records, as labeled.

13. An apparatus according to claim 10 wherein the computer program code instructions are configured to, when executed by the processing circuitry, cause the apparatus to index, based on the indexing, the respective record by associating the respective record with each of a plurality of sub-indices based upon the locality sensitive hash, and wherein a number of sub-indices corresponds to a number of blocking keys for the respective record.

14. An apparatus according to claim 10 wherein each blocking key of the one or more blocking keys represents a different string representation that combines components derived from attributes of the respective record.

15. An apparatus according to claim 10 wherein the respective blocking key represents the string representation that concatenates components derived from attributes of the respective record.

16. An apparatus according to claim 10 wherein the respective blocking key is based upon attributes representative of the plurality of dimensions of the respective record.

17. A computer program product configured to index a plurality of records based upon a similarity of the records along a plurality of dimensions, the computer program product comprising at least one non-transitory computer-readable storage medium having computer-executable program code instructions stored therein, the computer-executable program code instructions comprising program code instructions configured, upon execution, to:
- for each of the plurality of records, construct one or more blocking keys, wherein a respective blocking key represents a string representation that combines components derived from attributes of a respective record;
- for the respective blocking key, determine a locality sensitive hash based upon the string representation of the respective blocking key;
- index the respective record based upon the locality sensitive hash; and
- train a machine-learned classification model utilizing a batch of records that have been identified, based on the indexing, to be similar along at least one dimension.

18. A computer program product according to claim 17 wherein the computer-executable program code instructions further comprise program code instructions configured, upon execution, to transform, for the respective blocking key of a respective record, the string representation of the respective blocking key to a numeric vector, and wherein the program code instructions configured to determine the locality sensitive hash comprise program code instructions configured to determine the locality sensitive hash based upon the numeric vector.

19. A computer program product according to claim 17 wherein the computer-executable program code instructions further comprise program code instructions configured, upon execution, to provide, based on the indexing, batches of the plurality of records that, within a respective batch, are similar along at least one dimension to facilitate labeling of the plurality of records in advance of training the machine-learned classification model utilizing the plurality of records, as labeled.

20. A computer program product according to claim 17 wherein the respective blocking key is based upon attributes representative of the plurality of dimensions of the respective record.

* * * * *